Patented Oct. 27, 1925.

1,559,179

UNITED STATES PATENT OFFICE.

UMBERTO POMILIO AND FRANCESCO GIORDANI, OF NAPLES, ITALY, ASSIGNORS TO POMILIO BROTHERS CORPORATION, OF NEW YORK, N. Y., A CORPORATION OF NEW YORK.

METHOD FOR ELIMINATION OF IRON FROM SOLUTIONS OF LEUCITIC ROCKS.

No Drawing. Application filed August 25, 1922. Serial No. 584,384.

*To all whom it may concern:*

Be it known that we, UMBERTO POMILIO and FRANCESCO GIORDANI, subjects of the King of Italy, residing at Naples, in the Province of Naples and Kingdom of Italy, have invented certain new and useful Improvements in Methods for Elimination of Iron from Solutions of Leucitic Rocks, of which the following is a specification.

Methods are known for the complete utilization of the constituent elements of leucitic rocks and aluminum-potassium bearing rocks in general, for the production of both potassium salts and alumina this latter being as pure as required for immediate use in important industrial applications.

In this connection iron, the most harmful impurity, must be removed and several methods are available for this iron removal.

In another application No. 584,385, a process is pointed out consisting in attacking the previously enriched potassium aluminum bearing rocks with acid in small defect as compared with the theoretical amount, and separating iron by electrolysis; alumina being then separated by alkali precipitation.

The present invention is different in that the iron free liquid is electrolyzed in electrolytic cells of diaphragm type; the operation being so conducted that alumina is totally precipitated.

In the case of chlorides resulting by attack of leucite with hydrochloric acid, chlorine and hydrogen are after recovery synthetically combined and iron-free hydrochloric acid, as necessary for acid attack on leucite, produced.

The process may for instance take place as follows:

The liquor, resulting from acid treatment of the rock and previously neutralized, is submitted to electrolysis; the cells need not have diaphragms, the anodes are chosen according to anions present (graphite for Cl, lead for $SO_4$ etc.) and the cathode is iron. The current density and temperature should preferably be such as are best adapted for deposition of iron.

The liquor, after the removal of iron in this first electrolytic tank is pumped off to electrolytic cells of the diaphragm type, where separation of aluminum hydroxide is to take place.

The acid catholyte is electrolytically neutralyzed in this cell so that aluminum hydroxide is precipitated. If no free alkali is allowed to be present no aluminate is formed.

The catholyte is kept in circulation and allowed to pass through filter-presses where aluminum hydroxide is collected. The electrolysis is stopped when potassium salts are the only ones present in the neutral catholyte.

In case of hydrochloric solutions, hydrogen and chlorine are recovered with a view to synthetic, iron-free hydrochloric acid production especially adapted for leucite attack.

What we claim is:

1. In a process of treatment of leucitic rocks, the steps of attacking them with acid, removing the silica from the solution so formed, and precipitating the iron from said solution by electrolysis, substantially as set forth.

2. In a process of treatment of leucitic rocks the steps of attacking them with acid, removing the silica from the solution so formed, precipitating the iron from said solution by electrolysis, placing the resulting iron-free solution in diaphragm cells, neutralizing the catholyte, and electrolyzing such catholyte, substantially as set forth.

3. In a process of treatment of leucitic rocks the steps of attacking them with acid, removing the silica from the solution so formed, precipitating the iron from said solution by electrolysis, placing the resulting iron-free solution in diaphragm cells neutralizing the catholyte by the addition of an alkali and electrolyzing such catholyte the amount of alkali added being insufficient for the formation of aluminates, substantially as set forth.

4. In a cyclic process for the treatment of leucitic rocks the steps of attacking them with HCl, removing the silica from the solution so formed, precipitating the iron from such solution by electrolysis, placing the resulting iron-free solution in diaphragm cells, neutralizing the catholyte, electrolyzing the resulting solution, and recovering the hydrogen and chlorine to provide pure HCl suitable for a fresh leaching, substantially as set forth.

5. In a process of treatment of leucitic rocks, the steps of attacking them with acid, removing the silica from the solution so formed, precipitating the iron from said solution by electrolysis, placing the iron-free solution in diaphragm cells, neutralizing the catholyte, and electrolyzing the resulting solution while simultaneously filtering the catholyte, substantially as set forth.

In witness whereof, we have hereunto set our hands and seals at Naples, Italy this 21st day of September, A. D. nineteen hundred and twenty-two.

UMBERTO POMILIO. [L. S.]
FRANCESCO GIORDANI. [L. S.]